(12) United States Patent
Boyer et al.

(10) Patent No.: US 9,089,824 B2
(45) Date of Patent: Jul. 28, 2015

(54) CATALYTIC REACTOR WITH BOX DISTRIBUTION SYSTEM

(71) Applicant: IFP ENERGIES NOUVELLES, Rueil-Malmaison Cedex (FR)

(72) Inventors: Christophe Boyer, Charly (FR); Frederic Augier, Saint Symphorien D Ozon (FR); Frederic Bazer-Bachi, Irigny (FR); Yacine Haroun, Grigny (FR)

(73) Assignee: IFP ENERGIES NOUVELLES, Rueil-Malmaison Cedex (FR)

( * ) Notice: Subject to any disclaimer, the term of this patent is extended or adjusted under 35 U.S.C. 154(b) by 324 days.

(21) Appl. No.: 13/772,812

(22) Filed: Feb. 21, 2013

(65) Prior Publication Data

US 2013/0220886 A1    Aug. 29, 2013

(30) Foreign Application Priority Data

Feb. 24, 2012    (FR) ..................................... 12 00553

(51) Int. Cl.
*B01J 8/02*    (2006.01)
*C10G 49/00*    (2006.01)

(52) U.S. Cl.
CPC ................ *B01J 8/0278* (2013.01); *B01J 8/025* (2013.01); *C10G 49/002* (2013.01); *B01J 2208/00849* (2013.01)

(58) Field of Classification Search
CPC ............ B01J 2208/00849; B01J 8/025; B01J 8/0278; C10G 49/002
See application file for complete search history.

(56) References Cited

U.S. PATENT DOCUMENTS

| 6,093,373 A | 7/2000 | Darmancier et al. |
| 2010/0040511 A1 | 2/2010 | Lesieur |
| 2010/0185032 A1 | 7/2010 | Iselborn et al. |

OTHER PUBLICATIONS

Search Report for FR 1200553 (Aug. 29, 2012).

*Primary Examiner* — In Suk Bullock
*Assistant Examiner* — Derek Mueller
(74) *Attorney, Agent, or Firm* — Millen, White, Zelano & Branigan, P.C.

(57) ABSTRACT

The catalytic reactor consists of a chamber [1] that contains at least one catalyst bed [2] in solid form, with the reactor being supplied with effluent to be treated by a pipe [3] that empties into a separator [4] between gas and liquid, with the liquid obtained from the separator being collected in a tank, and a plate [9] being arranged between the separator [4] and the solid catalyst bed [2]. The plate [9] consists of at least two closed boxes [10], with at least two vertical tubes [11] provided with openings [12] linking with the interiors of the boxes [10] passing through the boxes, and with the liquid distributor [8] channeling the liquid from the tank into said boxes [10].

21 Claims, 3 Drawing Sheets

CATALYTIC REACTOR WITH BOX DISTRIBUTION SYSTEM

This invention relates to the field of the distribution of gas and liquid in the catalytic reactors of the fixed-bed type, which are used in particular in the operations for hydrotreatment of hydrocarbon feedstocks. The invention describes a system for distribution of gas and liquid flows in a catalytic reactor.

The catalytic reactors are used in particular in the petroleum and petrochemical industry for treating hydrocarbon effluents by hydrotreatment reaction. These reactions make the carbon compounds react with hydrogen in reactions of hydrogenation, hydrodesulfurization, hydrodenitration, hydrocracking and hydrodearomatization.

A catalytic reactor generally consists of a chamber of cylindrical shape, comprising one or more catalytic beds, i.e., a bed of solids, for example in the form of extrudate or sphere, which have as their role to catalyze the hydrotreatment reaction. The reactor is supplied at the top by a reaction fluid, consisting of the hydrocarbon effluent in liquid form and hydrogen in gaseous form. The reaction fluid is distributed homogeneously over the section of the reactor by distribution means. The homogeneous flow of the reaction fluid in the catalytic bed makes it possible to optimize the reaction by making use of the entire catalyst solid in the reactor and to prevent superheating zones due to the exothermicity of the hydrotreatment reactions.

The document U.S. Pat. No. 6,093,373 describes a means for distributing gas and liquid in a reactor. The distribution means consists of a liquid-tight plate placed on the section of the reactor. The plate is equipped with shafts that have the role of mixing the gas and liquid collected above the plate and distributing this mixture under the plate. The shafts are in the form of vertical tubes placed on the plate. The gas and the liquid enter into the shaft by openings located above the plate, and the mixture of gas and liquid is evacuated under the plate via the shaft.

The flow at the shaft outlet forms a relatively concentrated two-phase jet, which is problematic because the liquid does not spray the entire column section. This is why the span between shafts is relatively limited (between 80 and 200 mm in general), with devices of the deflector or grid type further being added under said shafts. In addition, to be usable over significant ranges of liquid flow rates, it is necessary to have high shaft heights and/or a large number of opening levels.

The significant heights bring about problems of bulkiness that may be incompatible with the installation of these plates in an industrial reactor. In addition, the multiplicity of the rows of openings has an impact on the liquid distribution's sensitivity to horizontality defects. Actually, when the liquid level is close to a row of openings, the plate-level imbalances will produce significant imbalances in the distribution of the liquid if the plate is not perfectly horizontal.

The objective of the proposed invention is to use a distributor plate at the top of a reactor that is low in height and therefore requires little space, having a lower sensitivity to horizontality defects than that of the standard plates with perforated shafts.

This invention proposes using shafts in closed boxes so as to be able to fill these boxes with liquid, which makes it possible in particular to reduce the height of the shafts and to ensure good distribution despite horizontality defects.

In a general manner, the catalytic reactor according to the invention comprises a chamber that contains at least one solid catalyst bed, with the reactor being supplied with gas and liquid effluents that are to be treated by a pipe that empties into a separation means between gas and liquid, with the liquid obtained from the separation means being collected in a tank, and a plate being arranged between the separation means and the solid catalyst bed. The plate consists of at least two closed boxes, with at least two vertical tubes provided with openings linking with the interiors of the boxes passing through the boxes, with liquid distribution means channeling the liquid from the tank into said boxes.

According to the invention, the distribution means and the openings can be sized in such a way that during the operation of the reactor, the boxes and the distribution means are filled with liquid.

The boxes can have a height of between 20 and 100 mm.

The tubes can comprise a portion located above the boxes, said portion being provided with an opening.

The separation means can consist of a tubular element that extends the pipe by penetrating into the tank, a space for the passage of gas being provided between the tubular element and the tank.

The tubular element can comprise means for imposing a centrifugal movement on the fluid that circulates in the tubular element.

A connecting means can connect the tank to the distribution means, with the connecting means producing a variable pressure drop based on the liquid level in the tank.

The connecting means can consist of a tube portion and an internal structure equipped with a float, with the vertical movement of the internal structure modifying the passage section in said tube portion.

The distribution means can be sized in such a way that the pressure drop between the tank and each of the boxes is essentially equal.

The distribution means can consist of pipes.

The reactor according to the invention can be used in a hydrotreatment process, in which a liquid hydrocarbon effluent and gaseous hydrogen are introduced into said pipe.

This invention makes it possible to maintain the efficiency of the distribution of the flow of gas and liquid despite a horizontality defect of the plate, because in the operating range, the boxes are filled with liquid and therefore the openings of the tubes in the boxes are permanently supplied with liquid.

In addition, the liquid level above the openings can be significant in the network of pipes and in the tank located above the boxes. As a result, the hydrostatic level of liquid above the openings ensures a consequent pressure of the jet at the openings and therefore good homogenization of liquid with the gas in the tubes.

Furthermore, the distribution device according to the invention can be reassembled at the top of the reactor, in the hemispherical portion of the ring. Thus, although the system according to the invention is potentially more imposing overall than a conventional plate, it is arranged higher in the hemispherical portion. And taking into account that the height of the boxes can be reduced, it makes it possible to reduce the volume occupied in the cylindrical portion of the reactor and therefore to gain the available volume for placing the catalyst.

Furthermore, the distribution device of the invention can consist of several individual elements that are introduced without problems into the reactor via a manhole.

BRIEF DESCRIPTION OF THE DRAWINGS

Other characteristics and advantages of the invention will be better understood and will emerge more clearly from reading the description given below by referring to the drawings among which:

FIG. 1 shows a reactor portion in which a hydrotreatment reaction is carried out. The reactor consists of a chamber 1 that contains at least one solid catalyst bed 2. The chamber 1 can have the shape of a cylinder that is closed at its ends. In general, the shaft of the cylinder is oriented in the vertical direction. For example, the cylinder can have a diameter of between 0.5 and 10 meters and a height of between 3 and 20 meters. The ends of the cylinder can be closed by hemispherical portions. The solid catalyst can be in the form of extrudates or balls arranged between two grids for forming a bed that in general extends over the entire horizontal section of the inside volume of the chamber. The cylinder is supplied via the pipe 3 with reaction fluid shown by the arrows F, consisting of a gas and a liquid, for example a feedstock of liquid hydrocarbons and gaseous hydrogen. The hydrocarbon feedstock can contain compounds having 4 to 20 carbon atoms, preferably 8 to 20 carbon atoms. The reaction fluid flows in a downward vertical direction into the chamber 1, in particular under the action of gravity. In other words, the gas and the liquid flow at co-current from the top to the bottom in the reactor.

Figure 1:
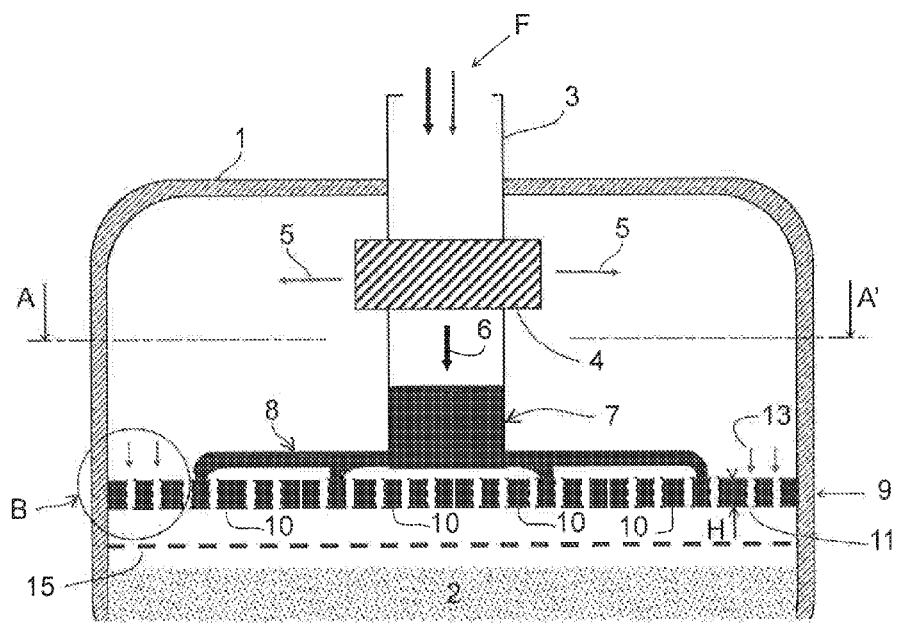
FIGS. 1, 2 and 3 schematize a device for distributing gas and liquid in a reactor according to the invention, FIGS. 4 and 5 each show an embodiment of a distribution device for a reactor according to the invention.

The pipe 3 empties into the upper portion of the chamber 1, above the solid catalyst bed 2. The pipe 3 works with a distribution system consisting in particular of a system 4 for separating gas and liquid and a distributor plate 9. More specifically, the pipe 3 works with a system 4 for separating gas and liquid. The separated gas in the system 4 is evacuated according to the arrows 5 into the empty space located in the upper portion of the chamber 1 above the plate 9.

The liquid that is separated in the system 4 is evacuated along the arrow 6 into the liquid tank 7. The liquid tank can consist of a receptacle containing liquid, for example in the form of a cylinder whose bottom is closed. The liquid tank 7 links at least one network of pipes 8 with a plate 9. Thus, the plate 9 is arranged between the system 4 for separating gas and liquid and the bed 2. The plate 9 has as its role to distribute homogeneously, over the bed 2, the gas and the liquid that are introduced into the chamber 1 via the pipe 3. Preferably, the plate 9 extends horizontally to cover the entire section of the chamber 1.

The plate 9 consists of at least one closed chamber, preferably several closed chambers, called boxes 10 below. The boxes are supplied with liquid coming from the separation system 4 via the tank 7 and the network of pipes 8.

Figure 2:
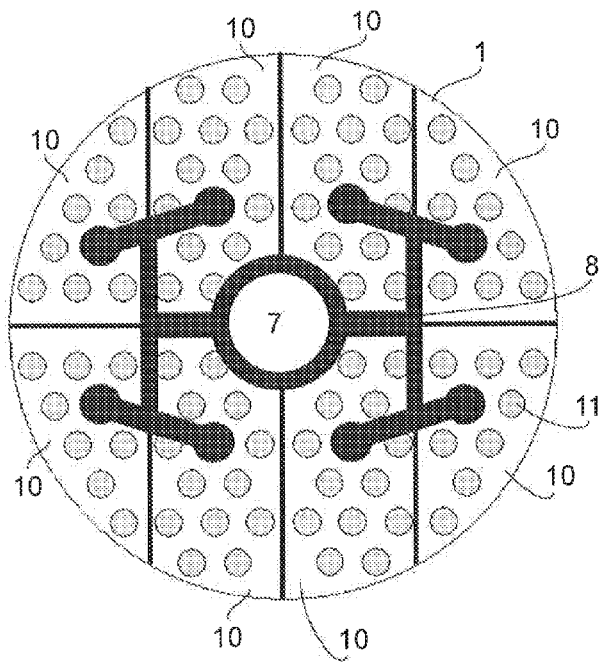

FIG. 2 shows a cutaway view of the reactor along the axis AA' shown in FIG. 1. In FIG. 2, the plate 9 consists of 8 boxes 10 that are distributed over the inner section of the chamber 1. The network of pipes 8 connects the tank 7 to different boxes 10.

For the embodiment of the invention, the height H of the boxes 10 can be low, for example between 20 and 100 mm. The sizing of the network of pipes 8 can be determined according to the rules of the art to ensure a balanced distribution of flow rates of liquid in the boxes and to ensure a similar liquid dwell time in the different pipes 8. Preferably, the pipes 8 are sized in such a way that the pressure drop of the liquid for circulating from the tank 7 to the boxes is essentially equal in the different pipes 8 so that the liquid is perfectly distributed between the boxes. If necessary, it is possible to arrange elements in the pipes 8 for increasing the pressure drop. For example, these elements can be a restricted diameter or a plate with openings for increasing the pressure drop in one of the pipes 8 and thus for balancing the flow rates between pipes.

With reference to FIGS. 1 and 2, the tubes 11 that allow the gas to pass, through the boxes, vertically pass through the boxes, between the space located above the plate 9 and the space located below the plate 9. For the sake of reading alone, a tube 11 was referenced in each of FIGS. 1 and 2; nevertheless, the boxes shown in these figures comprise a large number of tubes.

The distance separating two tubes 11 from the plate 9, also called "span" between the tubes, can be between 25 and 250 mm, preferably between 25 and 150 mm, to ensure a distribution of the flow of gas and liquid over the entire horizontal section of the catalyst bed 2. To improve the distribution of the flow of gas and liquid in the section of the bed 2, it is possible to arrange distribution means 15 between the plate 9 and the bed 2. The distribution means 15 can also be used to increase the distance between the tubes 11 and consequently to reduce the number of tubes 11 on the plate 9. For example, the distribution means 15 consist of one or more grids arranged at different horizontal planes located at a distance of between 20 and 300 mm, preferably between 50 and 150 mm, from the plate 9. In addition, or alternatively to the grids, the means 15 can comprise deflectors arranged at the base of the tubes 11 under the plate 9. The deflectors can be a solid flat plate or a plate with holes or a cone portion whose top is directed upward.

Figure 3:
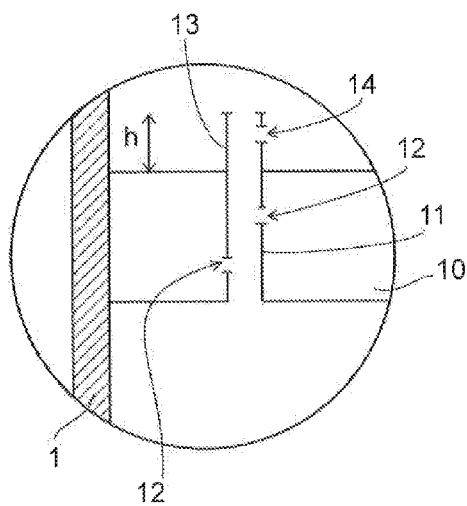

FIG. 3 shows a magnification of the zone B referenced in FIG. 1. With reference to FIG. 3, each tube 11 is provided with one or more openings 12 that allow the passage of the liquid. The diameter of the tubes 11 can be between 10 mm and 50 mm. The liquid that is contained in the box flows into the tube via the openings 12. Thus, the gas that flows through tubes 11, in the direction of arrows 13, is mixed with the liquid that escapes from the boxes 10 via the openings 12. With reference to FIG. 1, the mixture of gas and liquid is evacuated under the plate 9 to spray the solid catalyst bed 2 homogeneously. Consequently, the fact that the boxes 10 are loaded with liquid during the operation of the device makes it possible that the distribution of liquid via the openings 12 is not very sensitive to a horizontality defect of the plate 9.

The height of the boxes 10 and the openings 12 in the tubes 11 are defined in such a way that, over the operating range of the plate, the boxes 10 are filled with liquid.

The separation that is carried out in the device 4 cannot be total: one portion of liquid can be entrained with the gas stream 5. In this case, liquid can be collected on the surface of the plate 9. In this case, the tubes 11 can be extended above the boxes 10, i.e., above the plate 9, by a tube portion 13 that is vertical and of the same diameter as the tube 11. For example, the height h of the tubes 13 can be between 10 and 100 mm. The tube portion 13 also comprises one or more lateral openings 14 that allow the passage of the liquid that would be collected on the plate 9. The liquid that is collected on the plate 9 flows from the plate 9 into the tubes via the openings 14 so as to be mixed with the gas stream that circulates in the tube 13 and then in the tube 11. Thus, excess liquid flow entrained by the gas stream 5 is distributed in the tubes 11.

Preferably, the diameters of the openings 12 are determined in such a way as to create a pressure drop that is sufficient to hold the boxes 10 in liquid feedstock, even for a minimum liquid flow rate of the fluid F. The diameter of the openings 12 can be between 2 and 15 mm, preferably between 4 and 12 mm. Likewise, preferably the pressure drop produced by each of the pipes 8 is determined for maintaining a liquid level in the tank 7 so as to promote the balance of liquid flow rates in the different pipes 8.

Figure 4:
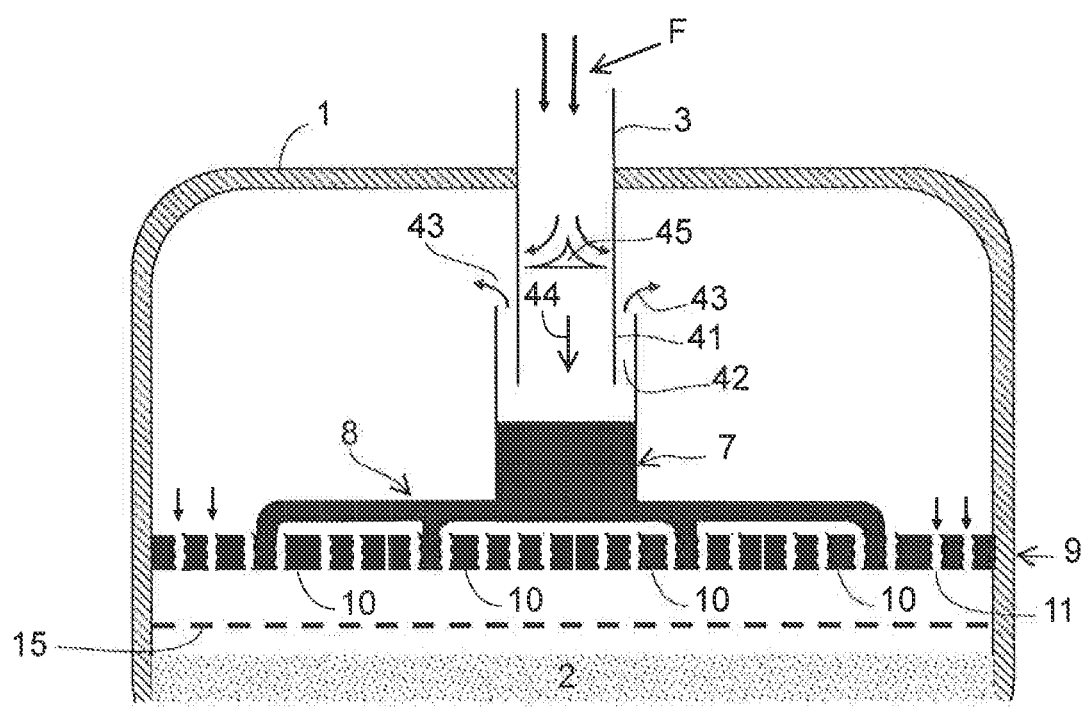

FIG. 4 shows the reactor of FIG. 1 with a particular embodiment of the system 4 for separating gas and liquid. The references of FIG. 4 that are identical to those of FIG. 1 designate the same elements.

With reference to FIG. 4, the feed pipe 3 is extended by a tube portion 41 that penetrates into the interior of the tank 7. A lateral space 42 is maintained between the tube 41 and the upper portion of the tank 7. The reaction fluid that comes in via the pipe 3 is directed through the tube 41 into the tank 7. The liquid that circulates according to the arrow 44 is collected in the tank 7, while the gas escapes from the tank 7 via the lateral space 42 in the direction of the arrows 43. In the case where the tube 41 and the tank 7 have a cylindrical shape, the space 42 has an annular shape.

The dimensions of the space 42 are determined in such a way as to prevent or to minimize the entrainment of liquid with the flow of gas.

To improve the separation, the system for separating gas and liquid can comprise an internal structure 45 arranged in the tube 41 so as to carry out a first separation operation. For example, in FIG. 4, the internal structure 45 is an obstacle whose purpose is to direct the flow in the pipe 41 toward the walls of the pipe 41. Thus, the gas and the liquid are separated by centrifuging. The internal structure 45 can consist of a helix or, alternatively, a plate with a conical shape, which imposes a centrifugal movement on the flow of fluid in the pipe 45.

Figure 5:
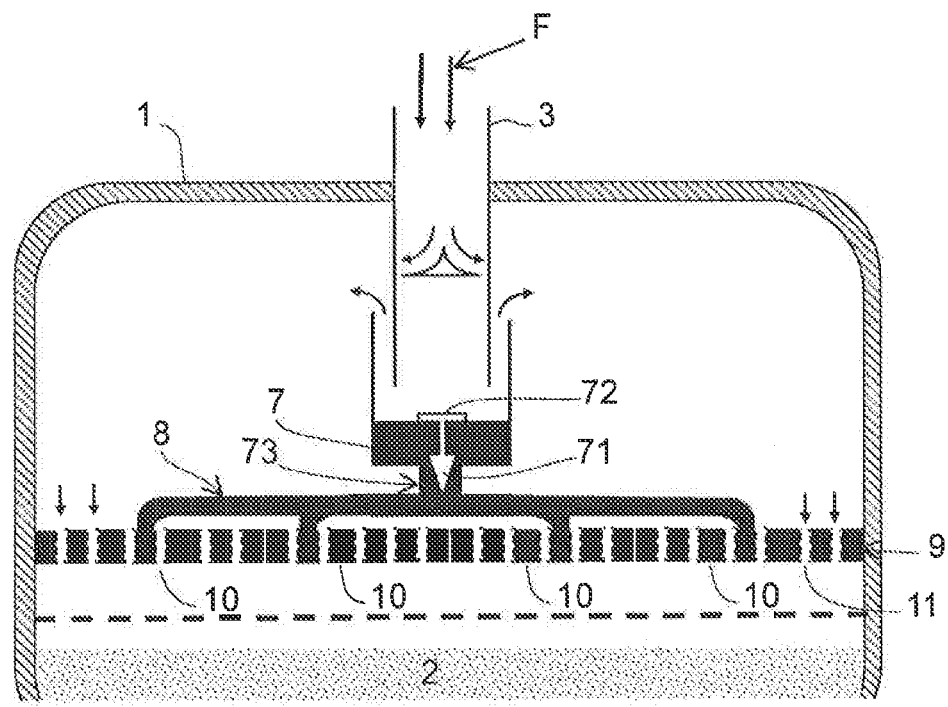

FIG. 5 shows the reactor of FIG. 4 with a particular embodiment of the connection between the tank 7 and the pipe network 8. The references of FIG. 5 that are identical to those of FIG. 4 designate the same elements.

With reference to FIG. 5, the tank 7 is connected to the pipe network 8 by a device that makes it possible to increase the pressure drop in the tube 73 when the level of liquid increases in the tank 7. The device can consist of a tube portion 73 that connects the bottom of the tank 7 to the pipe network 8, with the tube portion 73 comprising an internal structure 71 in the shape of a truncated cone that moves vertically by means of a float 72. Thus, when the liquid level increases in the tank 7, the movement of the truncated cone 71 produces an increase in the section for passage of the liquid in the tube 73. This device makes it possible to ensure that the boxes and the pipes 8 are filled with liquid during the operation of the reactor. In addition, this device makes it possible to make the distribution device according to the invention flexible with great variation of the flow rate of the fluid F. In addition, this device also makes it possible to maintain a moderate liquid level in the tank 7 and therefore makes possible a small space requirement.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 12/00.553, filed Feb. 24, 2012 are incorporated by reference herein.

The examples presented below make it possible to compare a distributor plate according to the invention relative to the prior art.

The distribution efficiency of the system according to the proposed invention is compared to that of a standard distributor plate according to the document U.S. Pat. No. 6,093,373 in the case where a horizontality defect is present. It is assumed that the two plates undergo a level difference of 10 mm, and an imbalance index of the liquid flow rate IQ is calculated such that:

$$I_Q = \frac{Q_L^{max} - Q_L^{min}}{\frac{Q_L^{max} + Q_L^{min}}{2}}$$

where $Q_L^{min}$ and $Q_L^{max}$ are the minimum and maximum flow rates at the outlet of the tube or the shaft of the plates. The lower the index IQ, the more the distribution of the liquid remains homogeneous.

The plate according to the prior art U.S. Pat. No. 6,093,373 consists of shafts with a 250 mm height and a 50 mm diameter with series of 3 lateral openings of 7 mm in diameter located at 50, 100 and 150 mm in height relative to the plate.

The plate according to the invention consists of boxes 10 that are 50 mm tall and through which pass tubes 11 that are 25 mm in diameter with an opening 12 of diameter 7 mm located 20 mm from the bottom of the boxes. The tank 7 has a horizontal section whose area represents 16% of the horizontal section of the chamber 1. The height between the bottom of the tank 7 and the outlet of the tubes 7 is 600 mm. The cumulative section of the tubes 11 represents 2.4% of the section of the reactor.

For the two configurations, the diameter of the chamber is 5,000 mm, the plates are equipped with 967 tubes or shafts, and the distance between two tubes, also called the span between tubes, is 150 mm.

Plate according to the prior art: diameter 5,000 mm, span between shafts 200 mm, number of shafts 547.

Plate according to the invention: diameter 5,000 mm, span between tubes 150 mm, number of tubes 967.

Figure 6:
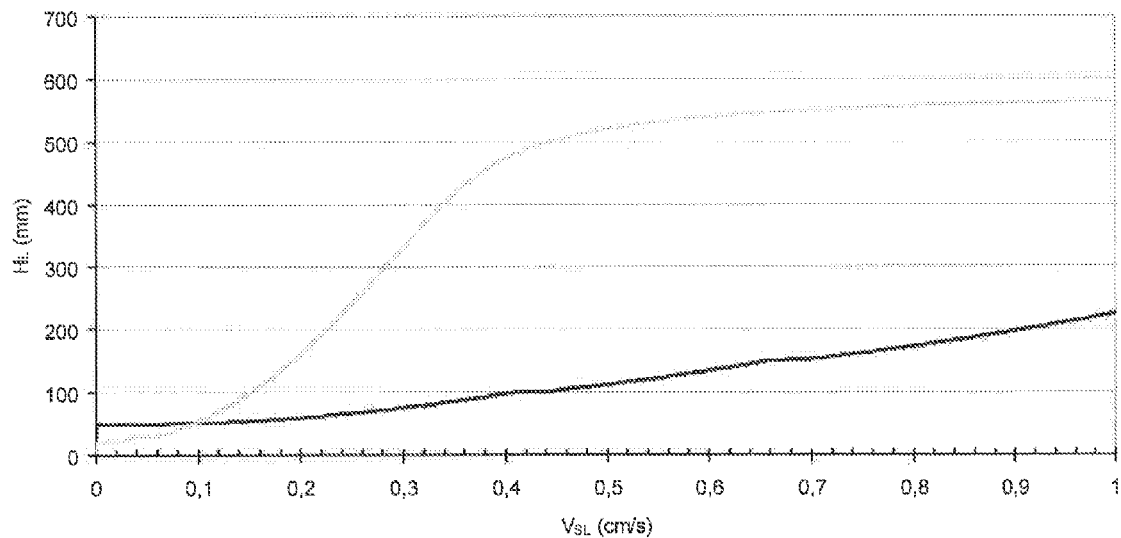
FIGS. 6 and 7 show performance curves of a distribution device according to the invention and a distributor plate according to the prior art.

FIG. 6 shows a graph with two curves providing the variation of the level of liquid $H_L$ in mm above the level of the plate for the plate according to the prior art and for the plate according to the invention based on the liquid surface velocity $V_{SL}$ that corresponds to the ratio of the liquid flow rate to the section of the reactor. It is assumed that it is desired to cover a liquid flow-rate range such that $V_{SL}$ is between 0.2 and 1 cm/s. The black curve corresponds to the case of the plate according to the prior art. The gray curve corresponds to the case of the plate according to the invention. For the plate according to the prior art, this liquid flow-rate range corresponds to a variation in the liquid level of between 60 and 226 mm. For the plate according to the invention, this corresponds to a variation in the liquid level of between 156 mm and 559 mm: these levels correspond to a variation of the liquid level in the tank that is located on the shaft of the reactor. The available level at the top of the chamber 1 (>1 m) makes it possible to largely absorb the necessary liquid level for this plate example according to the invention. As a result, the plate according to the invention is placed higher in the reactor than the plate according to the prior art, located under the tangent line.

Figure 7:
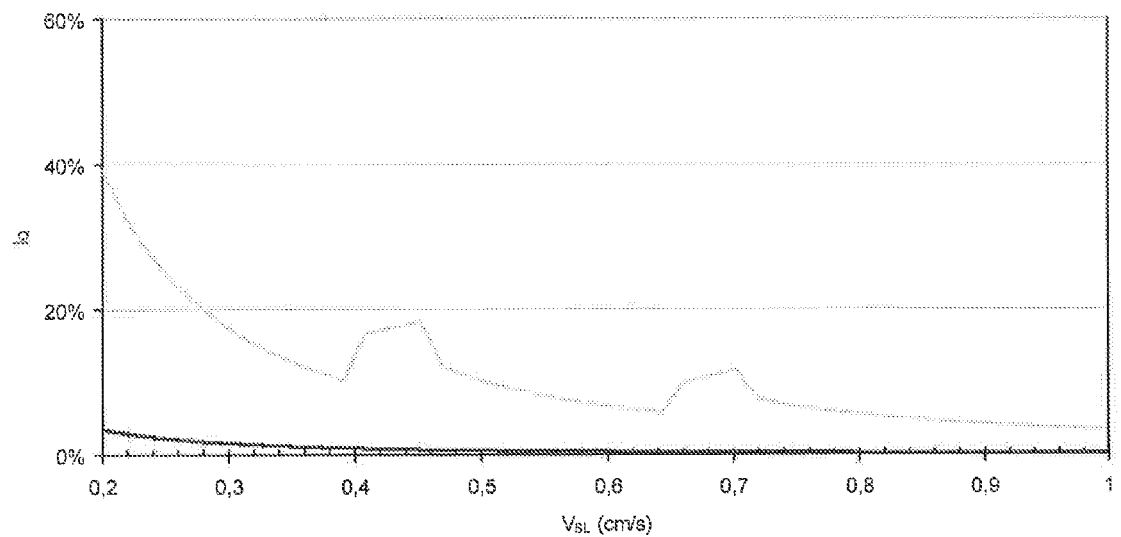

FIG. 7 shows a graph with two curves providing the variation of the imbalance index IQ based on the surface velocity $V_{SL}$ for the plate according to the prior art and for the plate according to the invention. The black curve corresponds to the case of the plate according to the invention. The gray curve corresponds to the case of the plate according to the prior art. For the plate according to the prior art, the imbalance index varies between 5% and 40% over the entire range of $V_{SL}$ that is considered with peaks at the openings. In contrast, for the plate according to the invention, the imbalance index k is considerably smaller and varies between 0 and 5%. This example shows that the plate according to the invention makes possible a very significant gain in terms of resistance to a horizontality defect during assembly and/or due to the deformation of the plate.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A catalytic reactor comprising:
   a chamber (1) and at least one solid catalyst bed (2) contained in said chamber (2),
   a pipe (3) for supplying said chamber with gas and liquid effluents to be treated, wherein said pipe (3) is in fluid communication with a separation means (4) for separating gas and liquid,
   a tank (7) in fluid communication with said separation means for collecting liquid discharged from said separation means (4),
   a plate (9) positioned within said chamber between said separation means (4) and said at least one solid catalyst bed (2), wherein said plate (9) comprises at least two closed boxes (10) and at least two vertical tubes (11), each of said vertical tubes being provided with openings (12), each of said vertical tubes (11) being in fluid communication with the interior of one of said at least two boxes (10) and each of said vertical tubes (11) providing passage of fluid through said plate (9),
   liquid distribution means (8) for providing fluid of liquid from said tank (7) into said at least two boxes (10) of said plate (9).

2. The catalytic reactor according to claim 1, wherein said liquid distribution means (8) and said openings (12) of said vertical tubes (11) are sized in such a way that during the operation of said reactor, said at least two boxes (10) are filled with liquid.

3. The catalytic reactor according to claim 1, wherein said at least two boxes (10) have a height of between 20 and 100 mm.

4. The catalytic reactor according to claim 1, wherein said vertical tubes (11) comprise a tube portion (13) that extends above the height of said boxes (10), and said tube portion (13) is provided with one or more openings (14).

5. The catalytic reactor according to claim 1, wherein said tank (7) has an open top and said separation means (4) comprises a tubular element (41) that extends said pipe (3) an penetrates into the top of said tank (7), wherein a space (42) for passage of gas is provided between said tubular element (41) and said tank (7).

6. The catalytic reactor according to claim 5, wherein said tubular element (41) comprises means (45) for imposing a centrifugal movement to fluid circulating in said tubular element (41).

7. The catalytic reactor according to claim 1, further comprising a connecting means (73) that connects said tank (7) to said liquid distribution means (8), wherein said connecting means (73) causes a variable pressure drop based on liquid level in said tank (7).

8. The catalytic reactor according to claim 7, wherein said connecting means (73) comprises a tube portion (73) and an internal structure (71) that is equipped with a float (72), wherein vertical movement of said internal structure (71) modifies flow passage within said tube portion of said connecting means (73).

9. The catalytic reactor according to claim 1, wherein said liquid distribution means (8) is sized so that the pressure drop between said tank (7) and each of said boxes (10) is essentially equal.

10. The catalytic reactor according to claim 9, wherein said liquid distribution means (8) is made of pipes.

11. A process for hydrotreatment within a catalytic reactor according to claim 1 said process comprising introducing a liquid hydrocarbon effluent and gaseous hydrogen into said pipe (3) for supplying said chamber with gas and liquid effluents to be treated.

12. The catalytic reactor according to claim 1, wherein the interior of each of said boxes (10) is in fluid communication with a plurality of said vertical tubes (11) and the distance between two adjacent vertical tubes is between 25 and 250 mm.

13. The catalytic reactor according to claim 12, wherein the distance between two adjacent vertical tubes is between 25 and 150 mm.

14. The catalytic reactor according to claim 1, wherein one or more distribution means (15) are positioned between said plate (9) and said at least one catalyst bed (2).

15. The catalytic reactor according to claim 14, wherein each of said one or more distribution means (15) is a grid located at a distance between 20 and 300 mm from said pate (9).

16. The catalytic reactor according to claim 14, wherein each of said one or more distribution means (15) is a deflector positioned at the base of each of said vertical tubes 911) under said plate (9).

17. The catalytic reactor according to claim 6, wherein said means (45) for imposing a centrifugal movement to fluid is a structure in the shape of a helix.

18. The catalytic reactor according to claim 6, wherein said means (45) for imposing a centrifugal movement to fluid is a plate with a conical shape.

19. The catalytic reactor according to claim 8, wherein said internal structure (71) is in the shape of a truncated cone.

20. The catalytic reactor according to claim 5, wherein said tubular element (41) comprises means (45) for imposing a centrifugal movement to fluid circulating in said tubular element (41).

21. The catalytic reactor according to claim 5, further comprising a connecting means (73) that connects said tank (7) to said liquid distribution means (8), wherein said connecting means (73) causes a variable pressure drop based on liquid level in said tank (7),
   wherein said connecting means (73) comprises tube portion and an internal structure (71) that is equipped with a float (72), wherein vertical movement of said internal structure (71) modifies flow passage within said tube portion of said connecting means (73), and
   wherein said tubular element (41) comprises means (45) for imposing a centrifugal movement to fluid circulating in said tubular element (41).

* * * * *